United States Patent
Wang et al.

(10) Patent No.: US 10,474,255 B2
(45) Date of Patent: Nov. 12, 2019

(54) INPUT ELEMENT WITH INTEGRATED FUNCTIONALITY

(71) Applicant: Apple Inc., Cupertino, CA (US)

(72) Inventors: Albert Wang, Sunnyvale, CA (US); Yuta Kuboyama, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/870,507

(22) Filed: Sep. 30, 2015

(65) Prior Publication Data
US 2017/0090602 A1    Mar. 30, 2017

(51) Int. Cl.
| | | |
|---|---|---|
| *G06F 3/0362* | (2013.01) | |
| *G06F 3/0487* | (2013.01) | |
| *G06F 1/3234* | (2019.01) | |
| *G06F 3/038* | (2013.01) | |
| *G06F 3/041* | (2006.01) | |
| *G06F 3/044* | (2006.01) | |
| *H02J 5/00* | (2016.01) | |
| *H04M 1/725* | (2006.01) | |
| *H04M 1/23* | (2006.01) | |

(52) U.S. Cl.
CPC .......... *G06F 3/0362* (2013.01); *G06F 1/325* (2013.01); *G06F 3/038* (2013.01); *G06F 3/041* (2013.01); *G06F 3/044* (2013.01); *G06F 3/0487* (2013.01); *H02J 5/005* (2013.01); *G06F 1/3262* (2013.01); *H04M 1/233* (2013.01); *H04M 1/236* (2013.01); *H04M 1/72519* (2013.01); *H04M 2250/22* (2013.01)

(58) Field of Classification Search
CPC ..... G06F 3/04883; G06F 3/044; G06F 3/0488
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |

(Continued)

FOREIGN PATENT DOCUMENTS

| | | |
|---|---|---|
| JP | 2000-163031 A | 6/2000 |
| JP | 2001-202178 A | 7/2001 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Chun-Nan Lin
(74) *Attorney, Agent, or Firm* — Kubota & Basol LLP

(57) ABSTRACT

An electronic device is disclosed. In some examples, the electronic device includes an input element configured to move in a first direction in response to an input at the input element. The input element can include circuitry configured to perform a first functionality, and process data resulting from the performance of the first functionality and output the processed data from the input element. In some examples, the electronic device includes a processor electrically coupled to the circuitry and configured to process the movement of the input element as an input to the electronic device, and receive the processed data and perform an action based on the processed data.

26 Claims, 6 Drawing Sheets

(56) References Cited

U.S. PATENT DOCUMENTS

| | | |
|---|---|---|
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,661,438 B1 | 12/2003 | Shiraishi et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,527,688 B2 | 9/2013 | Chatterjee et al. |
| 2002/0149561 A1* | 10/2002 | Fukumoto ............ G01C 21/3664 345/156 |
| 2006/0026521 A1* | 2/2006 | Hotelling ............... G06F 3/0418 715/702 |
| 2006/0197753 A1 | 9/2006 | Hotelling |
| 2009/0040183 A1* | 2/2009 | Buehler ................ H04L 67/306 345/168 |
| 2010/0220070 A1* | 9/2010 | Niwa ...................... G06F 3/011 345/173 |
| 2010/0238111 A1* | 9/2010 | Chen ...................... G06F 3/0383 345/157 |
| 2010/0321304 A1* | 12/2010 | Rofougaran ............ G06F 3/046 345/173 |
| 2014/0177873 A1* | 6/2014 | Chang ..................... H03G 3/04 381/104 |
| 2015/0058877 A1* | 2/2015 | Lakkundi ............. H04N 21/439 725/19 |
| 2015/0186705 A1 | 7/2015 | Magi |
| 2015/0199012 A1* | 7/2015 | Palmer .................... G06F 3/016 345/184 |
| 2016/0253146 A1* | 9/2016 | Yang ........................ H04N 5/60 381/107 |

FOREIGN PATENT DOCUMENTS

| | | |
|---|---|---|
| JP | 2002-342033 A | 11/2002 |
| JP | 2004-184396 A | 7/2004 |
| WO | WO-2014/200766 A1 | 12/2014 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

INPUT ELEMENT WITH INTEGRATED FUNCTIONALITY

FIELD OF THE DISCLOSURE

This relates generally to input elements in electronic devices, and more particularly, to integrating functionality into those input elements.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In addition to touch panels/touch screens, many electronic devices may also have other input elements, such as mechanical inputs (e.g., buttons, knobs and/or switches). These input elements can control power (i.e., on/off) and volume for the electronic devices, among other functions. Sometimes, it can be beneficial to integrate functionality—beyond traditional input functionalities—into these input elements.

SUMMARY OF THE DISCLOSURE

Some electronic devices may include input elements such as mechanical inputs (e.g., buttons, knobs and/or switches). These input elements can control power (i.e., on/off) and volume for the electronic devices, among other functions. Sometimes, it can be beneficial to integrate functionality—beyond traditional input functionalities—into these input elements. For example, sensors (e.g., temperature, pressure, force, etc.) or other functionality circuits can be integrated into an input element to extend the functionality of an electronic device. In some examples, the electronic device can supply power to the input element, which can include logic and/or power circuitry, to power the functionality circuit(s) in the input element. In some examples, the functionality circuits in the input element can operate independently of functionalities in the electronic device, or together with the functionalities in the electronic device. Various examples of the above are provided in this disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some electronic devices may include input elements such as mechanical inputs (e.g., buttons, knobs and/or switches). These input elements can control power (i.e., on/off) and volume for the electronic devices, among other functions. Sometimes, it can be beneficial to integrate functionality—beyond traditional input functionalities—into these input elements. For example, sensors (e.g., temperature, pressure, force, etc.) or other functionality circuits can be integrated into an input element to extend the functionality of an electronic device. In some examples, the electronic device can supply power to the input element, which can include logic and/or power circuitry, to power the functionality circuit(s) in the input element. In some examples, the functionality circuits in the input element can operate independently of functionalities in the electronic device, or together with the functionalities in the electronic device. Various examples of the above are provided in this disclosure.

Figure 1:
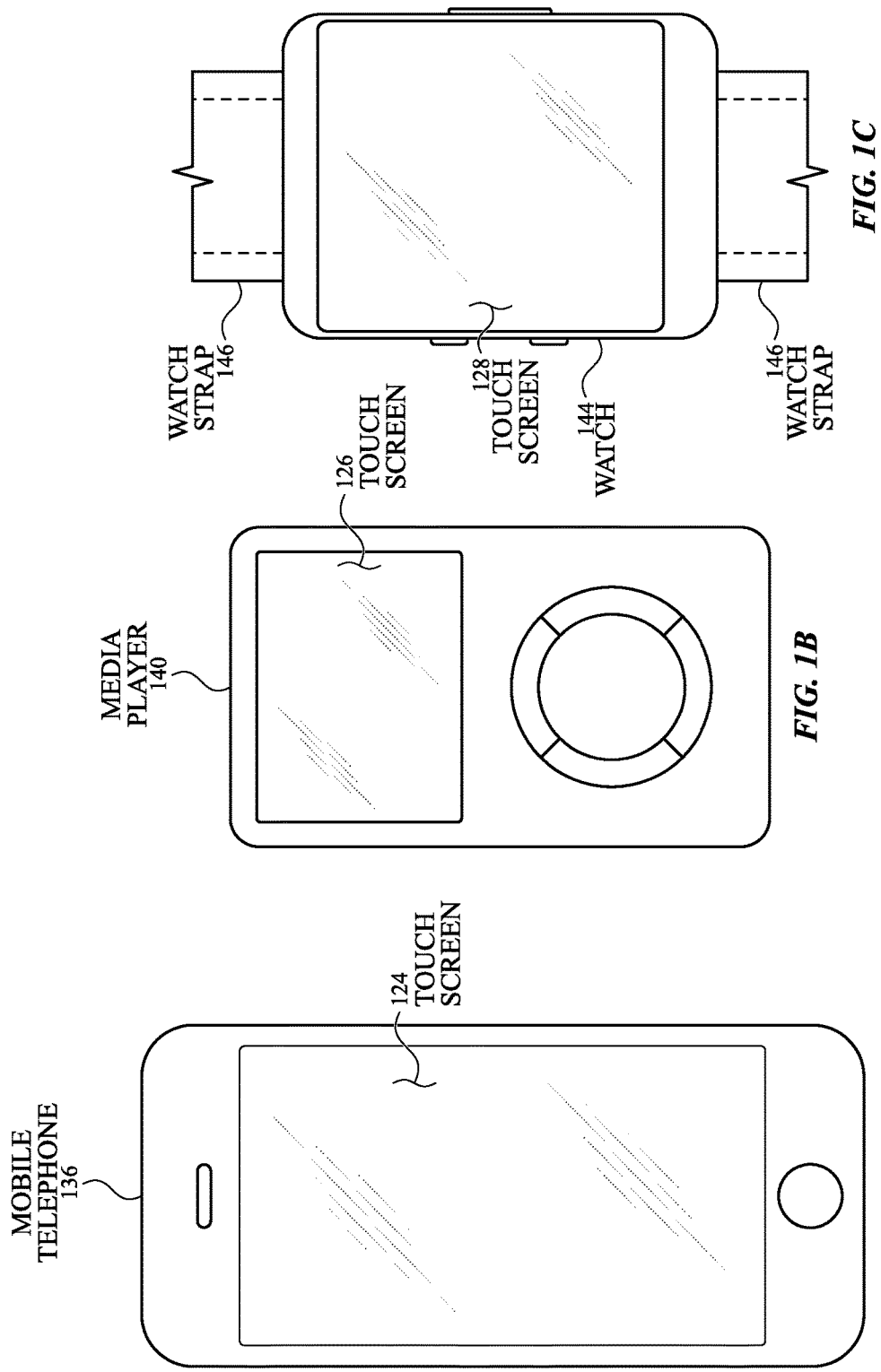
FIGS. 1A-1C show exemplary electronic devices in which at least some device functionality can be integrated into an input element of the devices according to examples of the disclosure.

FIGS. 1A-1C show exemplary electronic devices in which at least some device functionality can be integrated into an input element of the devices according to examples of the disclosure. FIG. 1A illustrates an example mobile telephone 136 that includes a touch screen 124. FIG. 1B illustrates an example digital media player 140 that includes a touch screen 126. FIG. 1C illustrates an example watch 144 that includes a touch screen 128. It is understood that the above touch screens can be implemented in other devices as well, such as tablet computers. Further, the above devices can include one or more input elements, such as mechanical inputs as will be described with reference to FIG. 2.

In some examples, touch screens 124, 126 and 128 can be based on self-capacitance. A self-capacitance based touch system can include a matrix of small, individual plates of conductive material that can be referred to as touch node electrodes. For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
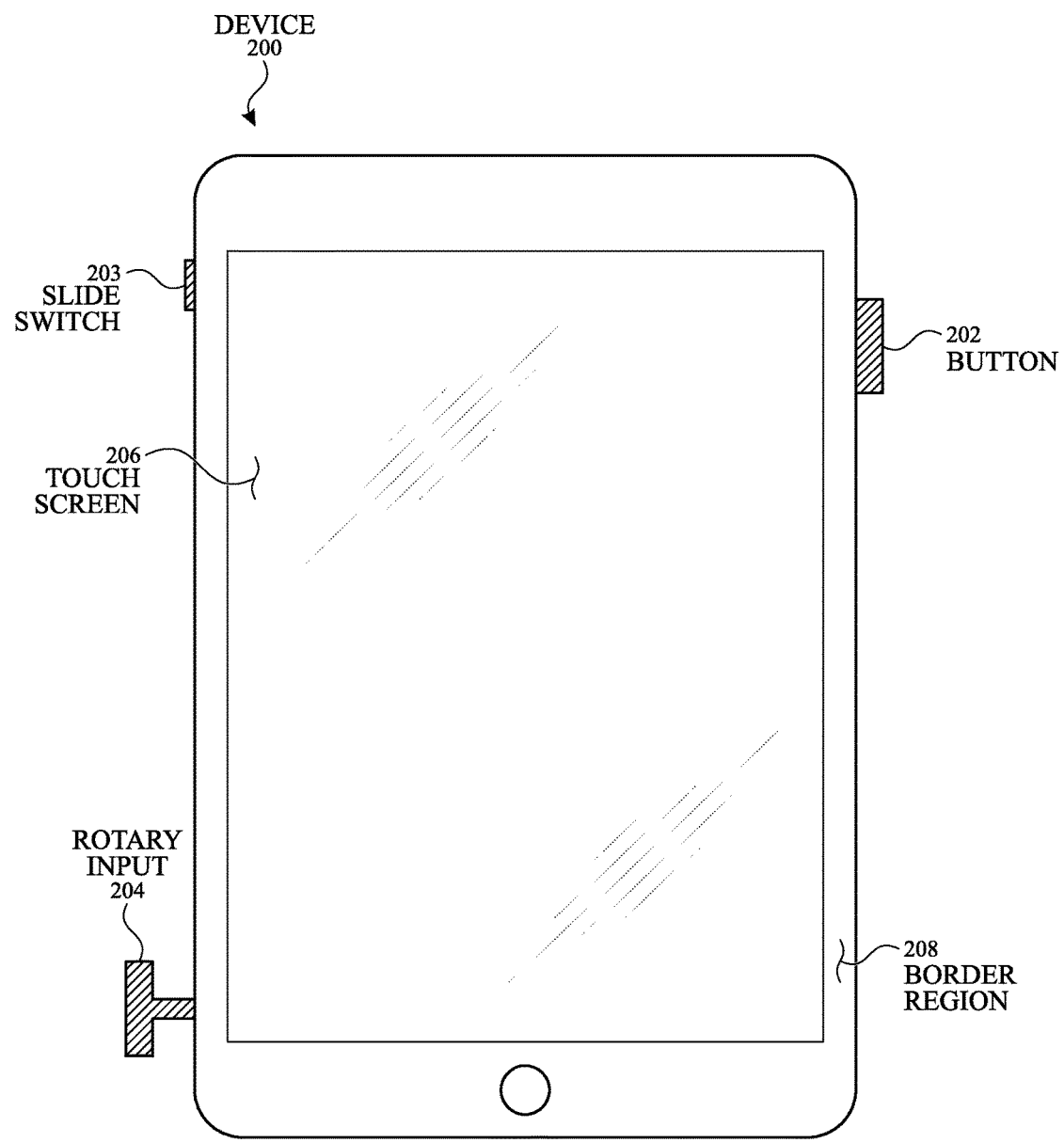
FIG. 2 illustrates an expanded view of an exemplary device according to examples of this disclosure.

FIG. 2 illustrates an expanded view of an exemplary device 200 according to examples of this disclosure. Device 200 can be any of mobile telephone 136, digital media player 140, watch 144, or any other wearable and/or electronic device. Device 200 can include touch screen 206 surrounded by border region 208. Border region 208 can be a region between touch screen 206 and the edge of device 200. In some examples, device 200 may not have border region 208, and may instead have a surface composed substantially of touch screen 206. Device 200 can also include one or more input elements (e.g., mechanical inputs, such as button 202, slide switch 203 and/or rotary input 204). Button 202 can be, for example, a linear button, which, in operation, can slide into and out of device 200 in a linear fashion. Rotary input 204 can be, for example, a knob. Slide switch 203 can be, for example, a switch that slides vertically along the edge of device 200. Button 202, slide switch 203 and rotary input 204 can be actuated by a user to interact with device 200 in various ways. For example, rotary input 204 can be: a knob by which a user can increase or decrease a volume output by speakers that can be included in device 200; a knob used to scroll up/down through content displayed on touch screen 206; and/or a knob used to zoom into/out of content displayed on the touch screen. Button 202 can be a power button by which a user can turn device 200 on or off. Slide switch 203 can be a slide switch for muting device 200. Button 202, slide switch 203 and rotary input 204 are provided by way of example only. It is understood that device 200 can include fewer or more input elements than the ones illustrated, including inputs other than buttons, slide switches and rotary inputs, such as on/off push/push buttons and multi-position rotary inputs (e.g., a rotary version of a slide switch to select a setting), for example. Other types of input elements are also within the scope of this disclosure. Non-mechanical inputs, such as touch input, can be provided to device 200 on touch screen 206.

Figure 3A:
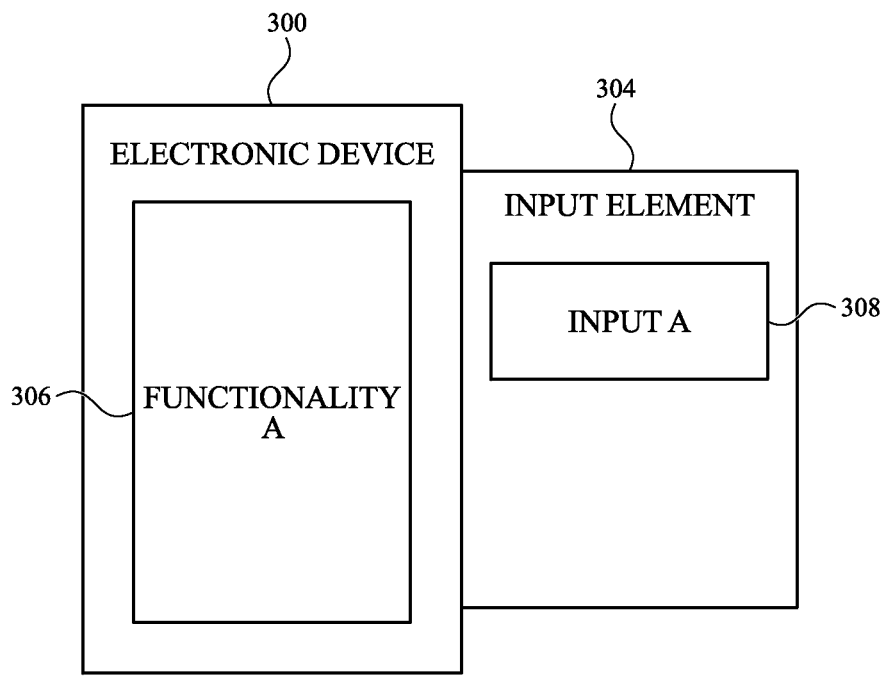
FIG. 3A illustrates a conceptual block diagram of an input element providing an input to an electronic device in accordance with the input element's type according to examples of the disclosure.

In some examples, the input elements of an electronic device (e.g., button 202, slide switch 203 and rotary input 204) can provide traditional input to the electronic device in accordance with their type. For example, a rotary input can provide rotational input to the electronic device. In some examples, a rotary input can be depressed (e.g., like a button), as well as rotated, such that the rotary input can provide rotational input as well as button-like input to the electronic device. FIG. 3A illustrates a conceptual block diagram of input element 304 providing input A 308 to electronic device 300 in accordance with the input element's type according to examples of the disclosure. Input element 304 can be any input element of an electronic device, such as button 202, slide switch 203 and rotary input 204 in FIG. 2. Input element 304 can provide input A 308 to electronic device 300 (e.g., a rotational input, a depression input, etc.) in accordance with the input element's type (e.g., a rotary input, a button, etc.). Electronic device 300 can have functionality A 306 (e.g., a set of functionality that the electronic device can provide), which can at times utilize input A 308 to perform certain actions. For example, input A 308 can correspond to an input requesting information (e.g., via depression of input element 304) about the ambient temperature in which electronic device 300 resides. In response to receiving input A 308, the electronic device 300 can check a temperature sensor included in the electronic device (e.g., included conceptually in functionality A 306) to determine the ambient temperature. Other types of electronic device 300 functionality circuits can similarly be included in functionality A 306, such as ambient pressure sensors, inertial measurement units (e.g., accelerometer, gyroscope, magnetometer), ambient light sensors, moisture/water sensors, antennas, fingerprint sensors, touch sensors, force sensors (e.g., to detect when input element 304 is being depressed, instead of or in addition to utilizing a mechanical depression detection mechanism), etc.

Figure 3B:
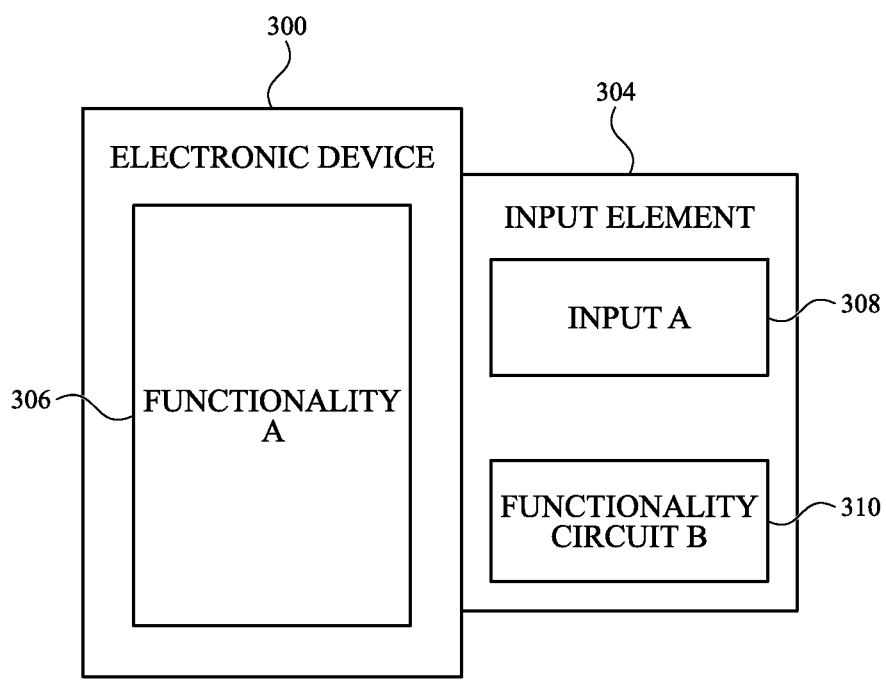
FIG. 3B illustrates a conceptual block diagram of a functionality circuit included in an input element according to examples of the disclosure.

In some examples, it can be beneficial to include additional functionality in the input element—in addition to the input element's function as a traditional input element—as will be described in more detail below. FIG. 3B illustrates a conceptual block diagram of functionality circuit B 310 included in input element 304 according to examples of the disclosure. Similar to as described with reference to FIG. 3A, input element 304 can provide input (e.g., input A 308) to electronic device 300. However, in FIG. 3B, input element 304 can also include functionality circuit B 310. Functionality circuit B 310 can be any functionality circuit, such as temperature sensors, ambient pressure sensors, inertial measurement units (e.g., accelerometer, gyroscope, magnetometer), ambient light sensors, moisture/water sensors, antennas, fingerprint sensors, touch sensors, force sensors, or any other circuitry, and in some examples, can augment the functionality of electronic device 300. For example, inertial measurement units in input element 304 can be used to detect movement (e.g., a rotation, depression, etc.) of the input element, which electronic device 300 can use to determine the corresponding input provided by the input element (e.g., a rotational input, a depression input, etc.). In some examples, functionality circuit B 310 can include functionality circuits that are not included in functionality A 306 in electronic device 300 (e.g., input element 304 can include an ambient temperature sensor, while the electronic device may not). In some examples, functionality circuit B 310 can include functionality circuits that are also included in functionality A 306 in electronic device 300 (e.g., both input element 304 and the electronic device can include ambient pressure sensors). Under certain conditions, electronic device 300 can utilize a functionality (e.g., an ambient pressure sensor) included in functionality A 306, and under other conditions, can utilize the same functionality (e.g., another ambient pressure sensor) included in functionality circuit B 310. For example, a sensor in electronic device 300 may be relatively fast-acting, but relatively inaccurate, while the same type of sensor in input element 304 may be relatively slow-acting, but relatively accurate. In circumstances where a result is required quickly, electronic device 300 can utilize the sensor included in the electronic device to acquire the desired data, whereas when an accurate result is required, the electronic device can utilize the sensor included in the input element to acquire the desired data. Other circumstances in which electronic device 300 determines whether to utilize a functionality in the electronic device or a functionality in input element 304 are similarly within the scope of the disclosure.

Inclusion of functionality circuits in input element 304 can be desired for any number of reasons. For example, electronic device 300 may include relatively sensitive electronic components such as a touch screen (as previously described) and related circuitry. Such sensitive components may perform best if electronic device 300 is substantially isolated from the environment in which the electronic device is used (e.g., the electronic device may need to be relatively well-sealed to moisture, temperature, etc.). Input element 304, on the other hand, may not include sensitive electronic components that require as much environmental isolation as do those in electronic device 300. Further, in some examples, input element 304 may be appropriately sealed more readily than electronic device 300, which can have a more complicated structure than the input element due to the inclusion of other environment-interfacing components such as speakers and microphones. Further, in some examples, input element 304 can be deliberately designed to be less isolated from the environment (e.g., open to the environment via an opening in the input element, for example) in which electronic device 300 is used (e.g., because the input element may not include components sensitive to the environment) so that sensors that may be included in the input element can more readily perform their functions. For example, a moisture sensor designed to sense moisture in the environment may perform more effectively if exposed to the environment as opposed to being sealed in the electronic device, or a temperature sensor designed to sense the temperature of the environment may perform more effectively if exposed to the environment as opposed to being sealed in the electronic device. Having the ability to include a functionality circuit in input element 304, as described in this disclosure, can decouple many design problems that may exist in designing electronic device 300 (e.g., environmental sealing problems).

Figure 4:
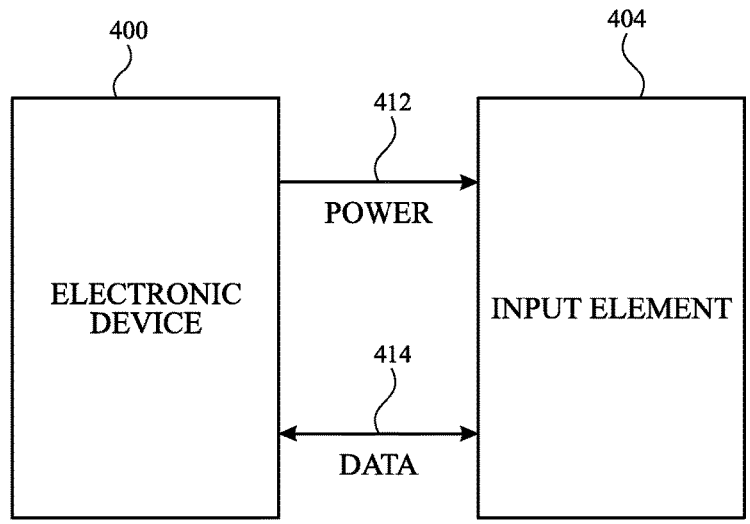
FIG. 4 illustrates a block diagram showing an exemplary functional relationship of an electronic device and an input element according to examples of the disclosure.

FIG. 4 illustrates a block diagram showing an exemplary functional relationship of electronic device 400 and input element 404 according to examples of the disclosure. Electronic device 400 can correspond to electronic device 300 in FIG. 3B, and input element 404 can correspond to input element 304 in FIG. 3B, for example. If input element 404 includes a functionality circuit (e.g., functionality circuit B 310), electronic device 400 may need to provide power to the input element to power the functionality circuit, illustrated as power link 412. Further, a functionality circuit in input element 404 may need to communicate with electronic device 400, so data link 414 may be provided to allow for two-way communication between the functionality circuit in the input element, and the functionality in the electronic device. An exemplary implementation of input element 404, power link 412 and data link 414 will now be described.

Figure 5:
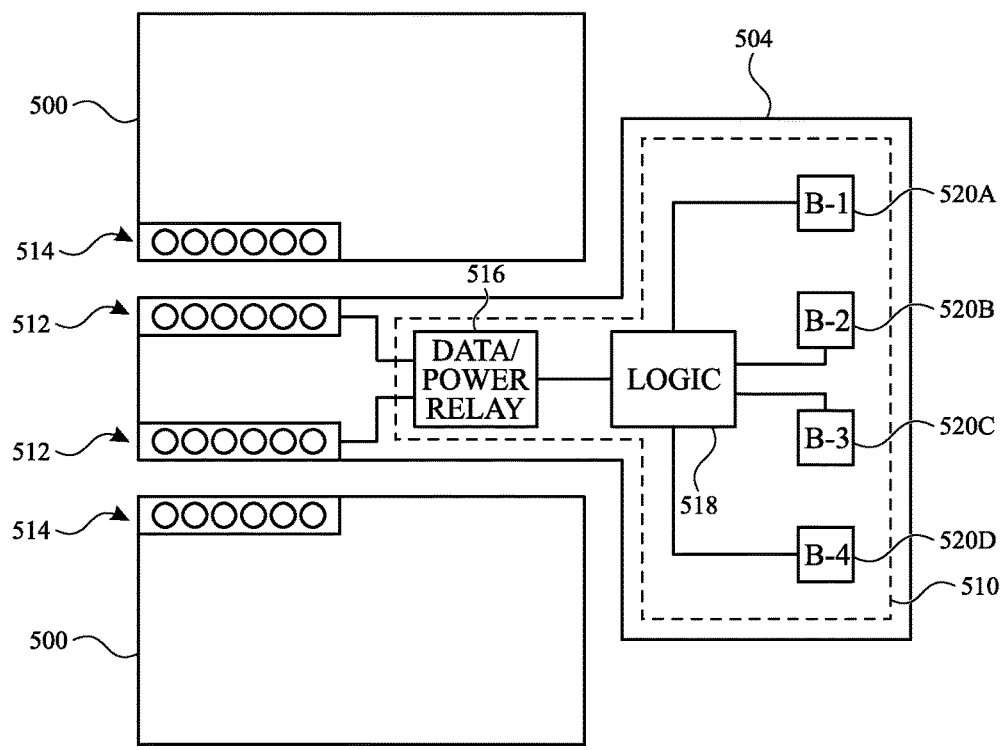
FIG. 5 illustrates an exemplary implementation of integrating a functionality circuit into an input element according to examples of the disclosure.

FIG. 5 illustrates an exemplary implementation of integrating functionality circuits 520 into input element 504 according to examples of the disclosure. Input element 504 can reside partially inside an opening in housing 500 of an electronic device, such as those illustrated in FIG. 1. Input element 504 can be, for example, a rotary input (e.g., rotary input 204 in FIG. 2) that can rotate and/or be depressed, like a button. Input element 504 can include various functionality circuits, such as functionality circuits B-1 520A, B-2 520B, B-3 520C and B-4 520D, referred to collectively as functionality circuits 520. Functionality circuits 520 can be circuitry configured to perform various actions as described in this disclosure. It is understood that functionality circuits 520 can include fewer or more functionality circuits than those illustrated. As previously discussed, functionality circuits 520 can include any number of functionality circuits, such as temperature sensors, ambient pressure sensors, inertial measurement units (e.g., accelerometer, gyroscope, magnetometer), ambient light sensors, moisture/water sensors, antennas, capacitive touch sensors, fingerprint sensors, and any other circuitry that can perform desired actions. Input element 504 can also include logic 518, which can be coupled to functionality circuits 520. Logic 518 can include circuitry configured to control and/or process data from functionality circuits 520—in some examples, in accordance with an instruction received from the electronic device to perform one or more functionalities. For example, logic 518 can cause functionality circuit B-1 520A to perform a temperature measurement (in some examples, in accordance with an instruction received from the electronic device to do so), and can process data returned from functionality circuit B-1 to determine the measured temperature and transmit that temperature to the electronic device. In some examples, input element 504 can include circuitry (e.g., memory, not illustrated) to store user-specific settings and/or data (e.g., passwords, identifying information, etc.), and can be removable from the electronic device and inserted into another electronic device, such that when the input element is inserted into another electronic device, the other electronic device can configure itself according to the user-specific settings and/or data stored on the input element, while also functioning as an input device to the other electronic device.

Input element 504 can also include data and power relay 516. Data and power relay 516 can include circuitry configured to receive power and/or data from the electronic device, as will be described below, and transmit that power and/or data to logic 518. Data and power relay 516 can also include circuitry configured to receive data from logic 518, and transmit that data to the electronic device, as will be described below. As such, data and power relay 516 can provide a power and/or data interface between input element 504 and the electronic device. In some examples, data and power relay 516, logic 518 and functionality circuits 520 can be included in an integrated circuit 510 (e.g., an application specific integrated circuit (ASIC)) that can be integrated in input element 504. For example, input element 504 can include a cavity or other inner volume in which integrated circuit 510 can be mounted. In some examples, one or more of functionality circuits 520 may not be included in integrated circuit 510, but rather may be external to the integrated circuit, but still within input element 504. For example, a touch sensor (e.g., a capacitive or other type of touch sensor) configured to sense a finger or other object touching input element 504 can be disposed along a boundary of the input element, and can be coupled via appropriate wiring to logic 518 on integrated circuit 510. Other configurations of functionality circuits 520, logic 518 and data and power relay 516 can similarly be implemented, including configurations in which the functionality circuits, the logic and the data and power relay are not included on an integrated circuit.

As mentioned above, it can be necessary for the electronic device to provide power to input element 504, and for the input element (e.g., the logic and/or functionality circuits included in the input element) to be able to communicate with the electronic device. For these purposes, in the example of FIG. 5, housing 500 can include primary coil or winding 514, which can be a circular collection of wires or other conductive elements that wrap around input element 504 on or close to the outer surface of the housing facing the input element. Input element 504 can include corresponding secondary coil or winding 512, which can be positioned opposite primary winding 514 and can comprise a circular collection of wires or other conductive elements that wrap around the input element on or close to the outer surface of the input element facing the primary winding. Primary winding 514 can work together with secondary winding 512 to inductively deliver power to input element 504. Specifically, power circuitry on the electronic device (e.g., one or more operational amplifiers in a unity gain configuration) can selectively drive current through primary winding 514, which can create magnetic fields within input element 504 between secondary windings 512. These magnetic fields can, in turn, cause current to flow in secondary winding 512, which can be delivered to data and power relay 516 to power logic 518 and functionality circuits 520.

In addition to power delivery, primary 514 and secondary windings 512 can be used for data communication between input element 504 and the electronic device (e.g., data communication from the input element to the electronic device, and/or data communication from the electronic device to the input element), thus forming a shared data and power link between the electronic device and the input element. In some examples, data communication can occur concurrently with power delivery. Specifically, the electronic device can modulate the power signal being delivered to input element 504 to communicate data to the input element while also delivering power to the input element, and data and power relay 516 on the input element can demodulate the power signal to recover the data being communicated to it from the electronic device. Analogously, data and power relay 516 can modulate a signal with which to drive secondary winding 512, which can then cause a corresponding current to flow in primary winding, which the electronic device can demodulate to recover the data being communicated to it from input element 504. Any appropriate modulation/demodulation scheme can be used for the above-mentioned modulation and demodulation. For example, frequency-shift keying (FSK) can be used by the electronic device and input element 504 to modulate and demodulate the frequencies of the above signals for data communication. In some examples, amplitude-shift keying (ASK) can instead be used by the electronic device and input element 504 to modulate and demodulate the amplitudes of the above signals for data communication. It is understood that other modulation and demodulation techniques can be used to concurrently transmit power and data between the electronic device and input element 504 in accordance with this disclosure. The inductive data and power delivery configuration of FIG. 5 allows for input element 504 to freely rotate, be depressed, tilt or otherwise move within housing 500, as no physical contact between the input element and the housing may be required for the data and/or power delivery to occur. Further, data and/or power delivery to input element 504 can continue while the input element rotates, is depressed, tilts or otherwise moves within housing 500.

In some examples, processing of the data outputted from functionality circuits 520 can be performed by logic 518. For example, data outputted from functionality circuit B-1 520A, which can be a temperature sensor, for example, can be processed by logic 518 to determine the sensed temperature, which can then be transmitted by the logic to the electronic device. In some examples, processing of the data outputted from functionality circuits 520 can be performed by the electronic device rather than by logic 518. For example, logic 518 can receive the raw data outputted from functionality circuits 520, and can simply transmit that raw data to the electronic device for further processing. In some examples, logic 518 can be configured to process data outputted from some of the functionality circuits 520, and not process data (e.g., forward the raw data) outputted from other functionality circuits. For example, data from relatively simple functionality circuits (e.g., temperature sensors, accelerometers, etc.) can be processed by logic 518, which can then transmit the processed data to the electronic device, while data from relatively complex functionality circuits (e.g., fingerprint sensors) may not be processed by the logic, but rather can be transmitted by the logic to the electronic device for further processing. Such forwarding of raw data can be beneficial, because in some examples, the electronic device may have more processing resources available to it with which to process the data from the relatively complex functionality circuits than does input element 504. In some examples, logic 518 can be statically programmed to perform the above data processing for some functionality circuits 520 and not for others. In some examples, logic 518 can dynamically determine whether or not to process the data from a particular functionality circuit 520 based on any number of considerations, as will be discussed below.

Figure 6:
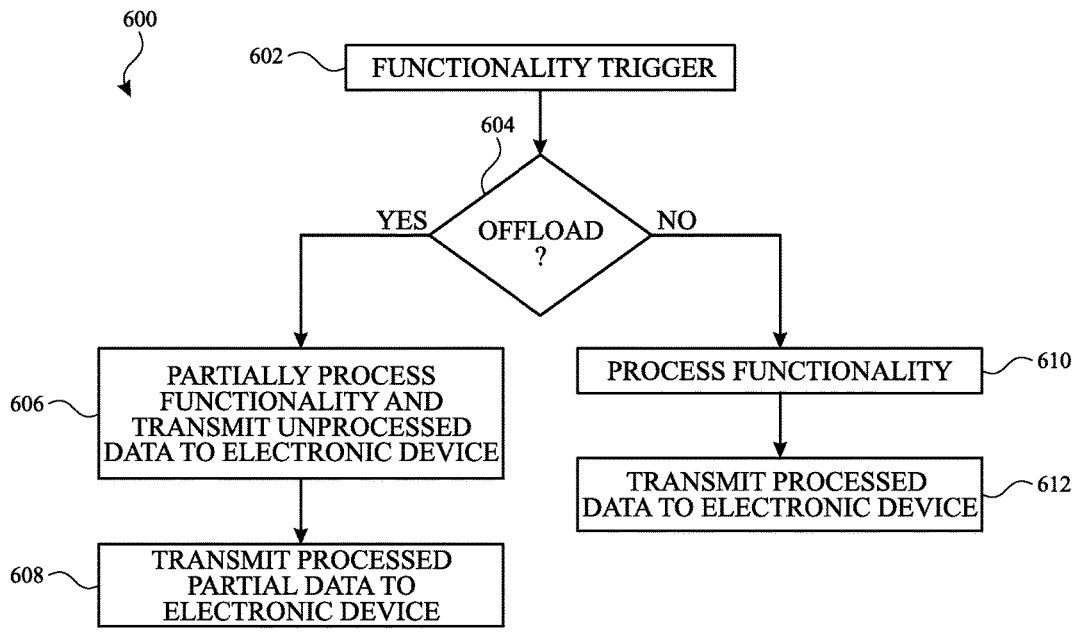
FIG. 6 illustrates an exemplary process for determining whether to process functionality data on the input element or on the electronic device according to examples of the disclosure.

FIG. 6 illustrates an exemplary process 600 for determining whether to process functionality data on the input element or on the electronic device according to examples of the disclosure. In some examples, process 600 can be performed by logic on the input element (e.g., logic 518 on input element 504 in FIG. 5), and in some examples, the process can be performed by logic on the electronic device. At 602, a functionality circuit on the input element can be triggered to perform a specified action, and can output data corresponding to that action. For example, a temperature sensor on the input element can be triggered (e.g., by the electronic device or by logic 518 on input element 514) to perform a temperature measurement. In response, the temperature sensor can output data indicative of the measured temperature to, for example, logic 518.

At 604, it can be determined whether processing of the data outputted by the triggered functionality circuit should be offloaded from the input element (e.g., to the electronic device), or whether the processing of the data should be performed on the input element. For example, logic 518 can determine whether to itself process the data from the triggered functionality circuit, and output the processed data to the electronic device, or simply output the raw, unprocessed data to the electronic device. In some examples, logic 518 can determine to itself process a portion of the data, and offload processing of the remaining data to the electronic device. For example, in the case of a fingerprint sensor in input element 504, logic 518 can itself process a portion of the data from the fingerprint sensor to determine whether a finger is touching the input element, while identification of a person using the fingerprint data, which can be a more complex task than a yes/no determination as to finger-contact, can be offloaded to the electronic device. The above determinations can be based on one or more considerations described in this disclosure, such as whether the data to be processed is relatively complex (processing of which can be offloaded to the electronic device, for example) or relatively simple (processing of which can be done on the input element, for example), how much data needs to be processed, and/or whether the data needs to be processed relatively quickly (processing of which can be offloaded to a faster processor on the electronic device, for example) or can be processed relatively slowly (processing of which can be done on a slower processor in the input element, for example). Other considerations can include whether the data needs to be processed in combination with other data that may or may not be sourced or otherwise available at input element 504.

If it is determined at 604 that the processing of the data outputted by the triggered functionality circuit should be at least partially offloaded from the input element, at 606, the unprocessed data can be transmitted to the electronic device. For example, logic 518 can transmit the unprocessed data to data and power relay 516, which can transmit the unprocessed data to the electronic device. In some examples, all of the data can remain unprocessed and transmitted as such to the electronic device, while in other examples, a portion of the data can remain unprocessed and transmitted as such to the electronic device, while the remainder of the data can be processed on the input element (e.g., by logic 518).

If it is determined at 604 that the processing of a portion of the data outputted by the triggered functionality circuit should be offloaded from the input element, and that the remainder of the data should be processed on the input element, after processing the remainder of the data on the input element at 606, the processed remainder of the data can be transmitted to the electronic device at 608 (e.g., by data and power relay 516).

If it is determined at 604 that the data outputted by the triggered functionality circuit should be processed on the input element, at 610, the data can be processed on the input element. For example, logic 518 can process the data on the input element. At 612, the processed data can be transmitted to the electronic device (e.g., by data and power relay 516).

Figure 7:
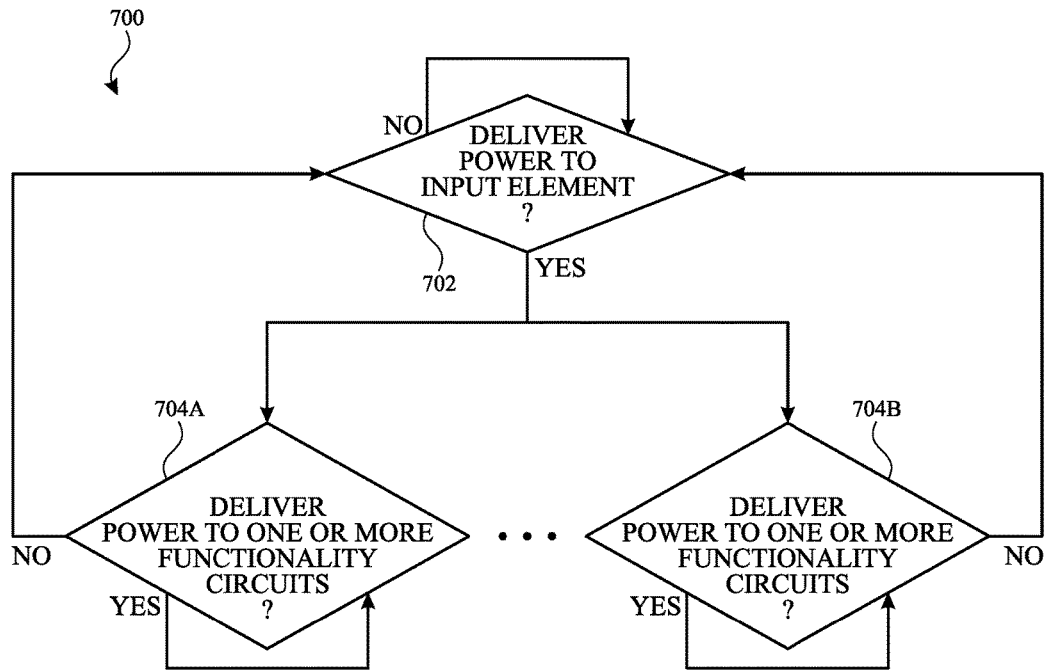
FIG. 7 illustrates an exemplary process for controlling power delivery to the input element and the functionality circuits on the input element according to examples of the disclosure.

In some examples, the electronic device of the disclosure can deliver power to the input element whenever the electronic device is powered-on, and in turn, the functionality circuits on the input element can be powered-on during such times as well. However, in some examples, whether power is delivered to the input element by the electronic device, and whether a given functionality circuit on the input element is powered-on, can be dynamically and independently controlled. FIG. 7 illustrates an exemplary process 700 for controlling power delivery to the input element and the functionality circuits on the input element according to examples of the disclosure. At 702, the electronic device (e.g., logic on the electronic device) can determine whether to deliver power to the input element. In some examples, the electronic device can determine to deliver power to the input element at all times when the electronic device is powered-on. In some examples the electronic device can determine to deliver power to the input element only when a power level of the electronic device (e.g., a charge level of a battery of the electronic device) is greater than a threshold amount (e.g., 10% or 20% charged). In some examples, the electronic device can determine to deliver power to the input element only when the electronic device is actively being used (e.g., a user is interacting with the electronic device). In some examples, the electronic device can determine to deliver power to the input element at certain predefined intervals of time, such as every 30 seconds, for a predetermined amount of time, such as for 10 seconds. In some examples, during this time, the electronic device can determine if any sensors in the input element have experienced changes in state since the last power delivery period (e.g., whether the sensors on the input element are detecting any changes from a baseline detection state). In some examples, the above-described amounts of time can change based on a current state of the electronic device (e.g., if a user is actively interacting with the electronic device, the electronic device can deliver power to the input element more frequently and/or for longer periods of time than if a user is not actively interacting with the electronic device for more than a predetermined time period, such as 10 seconds). In some examples, the electronic device can determine to deliver power to the input element if data from one or more of the functionality circuits on the input element is desired (e.g., a user has requested information that can be determined using data from one or more of the functionality circuits on the input element, or the electronic device requires data from one or more of the functionality circuits on the input element to make a determination, even absent a user request). In some examples, the electronic device can determine to deliver power to the input element if one or more functionality circuits on the input element require continued power to complete one or more measurements or other processes (e.g., temperature measurements, fingerprint sensor measurements, etc.). In some examples, the electronic device can determine an amount of power to deliver to the input element based on, for example, the number or type of functionality circuits that will be operating on the input element. For example, if a functionality circuit requiring a relatively great amount of power is operating on the input element, the electronic device can deliver more power to the input element than if a functionality circuit requiring a relatively little amount of power is operating on the input element.

If the electronic device determines not to deliver power to the input element, process 700 can remain at step 702 until the electronic device determines to deliver power to the input element. If, at 702, the electronic device determines to deliver power to the input element, at 704A, it can be determined whether to deliver power to one or more functionality circuits on the input element (i.e., the "power states"—e.g., on or off—of the functionality circuits can be controlled). This determination can be made on the electronic device (e.g., using a processor on the electronic device) or on the input element (e.g., using logic on the input element, such as logic 518 in FIG. 5). This determination can be based on considerations such as whether the electronic device requested data from a particular functionality circuit (in which case, power can be delivered to that functionality circuit), whether data is expected from a particular functionality circuit (e.g., because the functionality circuit is in the process of generating its data to return to, for example, logic 518), whether activity is detected at the input element, and many other considerations, as discussed in this disclosure. For example, if a capacitive touch sensor in the input element detects an object touching the input element, one or more other functionality circuits in the input element can be determined to receive power, because activity at the touch sensor can indicate other types of actions that may be performed using other functionality circuits in the input element (e.g., upon detecting contact with the input element, enabling and using a fingerprint sensor to identify a user touching the input element, and in response to an identification of a user with access rights to the electronic device, unlocking the electronic device). If it is determined that power should be delivered to the one or more functionality circuits, the process can remain at step 704A until it is determined that power should not be delivered to the one or more functionality circuits, as which point, process 700 can return to step 702.

In some examples, multiple steps 704 (e.g., 704A and 704B) can be performed concurrently on the electronic device or input element. Each of 704A and 704B can be directed to respective sets of functionality circuits for which the power delivery determination can be commonly determined. The grouping of the functionality circuits into the above sets can be static or dynamic. For example, the determination as to whether to power related functionality circuits, such as capacitive touch sensing and fingerprint sensing, can be commonly made for those related functionality circuits—as such, a step 704 can be performed for those functionality circuits, as a group. In some examples, the above capacitive touch sensing and fingerprint sensing can be statically grouped into a set, because the functionality circuits can be related. As another example, the sets of functionality circuits can be dynamically determined based on activity or a state of the electronic device or the input element. For example, if an application is running on the electronic device that requires fingerprint reading and inertial measurement unit functionality circuits to be active on the input element concurrently, determination 704 (e.g., step 704A) for those functionality circuits can be commonly made, independently of determinations for other groups of functionality circuits (e.g., step 704B), as illustrated in FIG. 7.

It is understood that in some examples, power delivery determinations for all functionality circuits in the input element can be commonly made. Further, in some examples, the electronic device can unilaterally (e.g., without feedback from the input element) determine to stop delivering power to the input element, regardless of any steps of process 700 that might be being performed on the input element, such as when power (e.g., battery power) on the electronic device is running low (e.g., less than 20% of full charge).

Figure 8:
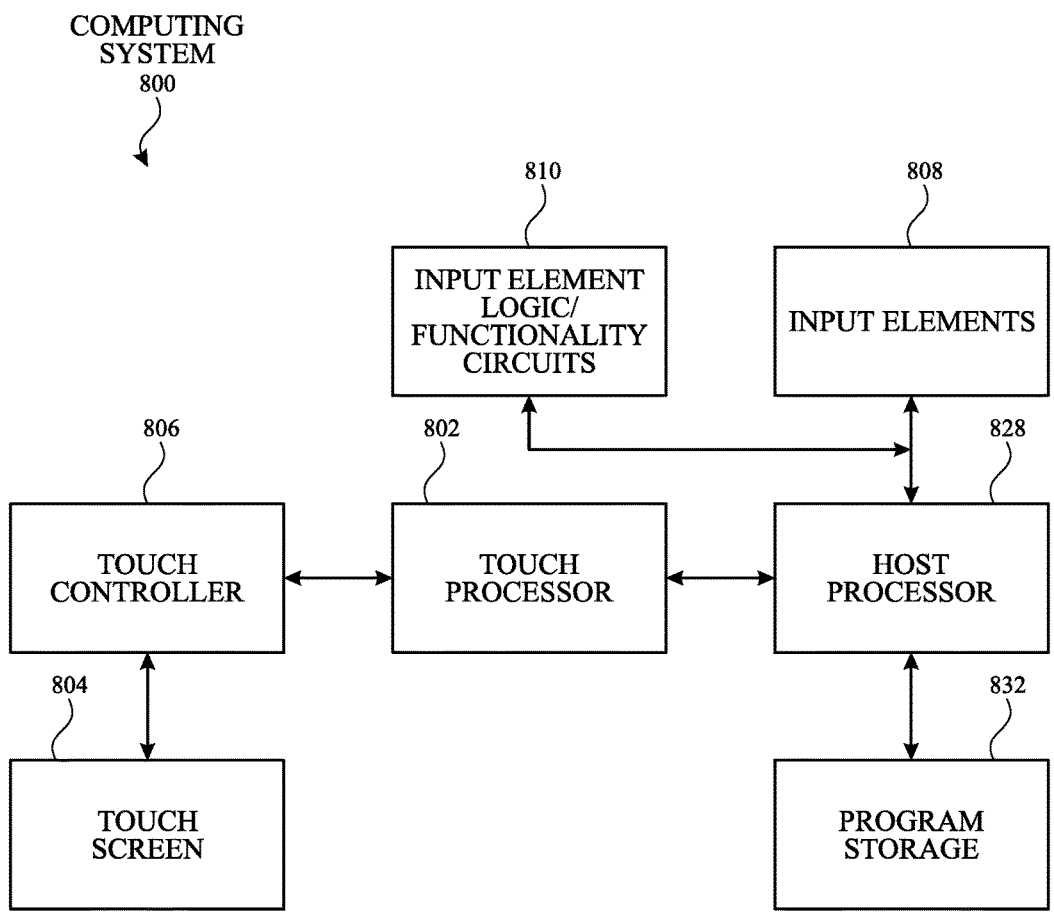
FIG. 8 illustrates an example computing system for implementing the input element functionality according to examples of the disclosure.

FIG. 8 illustrates an example computing system 800 for implementing the input element functionality according to examples of the disclosure. Computing system 800 can be included in, for example, mobile telephone 136, media player 140, watch 144 or any mobile or non-mobile computing device and/or wearable device that includes input element 808 (e.g., rotary input 204). Computing system 800 can include a touch sensing system including one or more touch processors 802, touch controller 806 and touch screen 804. Touch screen 804 can be a touch screen adapted to sense touch inputs, as described in this disclosure. Touch controller 806 can include circuitry and/or logic configured to sense touch inputs on touch screen 804. In some examples, touch controller 806 and touch processor 802 can be integrated into a single application specific integrated circuit (ASIC), though this need not be the case.

Computing system 800 can also include host processor 828 for receiving outputs from touch processor 802 and performing actions based on the outputs. Host processor 828 can be connected (e.g., electrically coupled) to program storage 832. For example, host processor 828 can contribute to generating a display image on touch screen 804 (e.g., by controlling a display controller to display a display image of a user interface (UI) on the touch screen), and can use touch processor 802 and touch controller 806 to detect one or more touches on or near touch screen 804. Host processor 828 can also contribute to sensing and/or processing inputs received from input elements 808 (e.g., rotary input 204), as well as communicating with input element logic/functionality circuits 810 (e.g., logic 518 and/or functionality circuits 520), as described in this disclosure. Host processor 828 can be electrically/communicatively coupled to input element logic/functionality circuits 810. The touch inputs from touch screen 804, the inputs from input elements 808 and/or the data from input element logic/functionality circuits 810 can be used by computer programs stored in program storage 832 to perform actions in response to the touch, inputs and/or data. For example, touch inputs can be used by computer programs stored in program storage 832 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Inputs from input elements 808 can be used by computer programs stored in program storage 832 to perform actions that can include changing a volume level, locking the touch screen, turning on the touch screen, taking a picture, and other actions that can be performed in response to inputs received from the input elements. Data from input element logic/functionality circuits 810 can be used by computer programs stored in program storage 832 to perform actions that can include displaying a current temperature of the ambient environment of the computing system using a temperature sensor in input elements 808, identifying a user touching the input elements using a fingerprint sensor in the input elements, determining whether a user is touching the input elements using a capacitive touch sensor in the input elements, and other actions that can be performed in response to data from functionality circuits in the input elements. Host processor 828 and/or input element logic/functionality circuits 810 can control operational states of the input element logic/functionality circuits, such as previously described with respect to FIGS. 6-7. Host processor 828 can also perform additional functions that may not be related to touch, input or functionality data processing.

Note that one or more of the functions described above can be performed by firmware stored in memory in computing system 800 and executed by touch processor 802, stored in program storage 832 and executed by host processor 828, or otherwise executed by input element logic/ functionality circuits 810. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Thus, the examples of the disclosure provide various ways to integrate functionality circuits into an input element of an electronic device.

Therefore, according to the above, some examples of the disclosure are directed to an electronic device comprising: an input element configured to move in a first direction in response to an input at the input element, the input element including circuitry configured to: perform a first functionality; and process data resulting from the performance of the first functionality and output the processed data from the input element; and a processor electrically coupled to the circuitry and configured to: process the movement of the input element as an input to the electronic device; and receive the processed data and perform an action based on the processed data. Additionally or alternatively to one or more of the examples disclosed above, in some examples, the input element comprises a rotary input configured to rotate in response to the input at the input element. Additionally or alternatively to one or more of the examples disclosed above, in some examples, the circuitry comprises logic and a first functionality circuit, the logic configured to process the data resulting from the performance of the first functionality and output the processed data from the input element, and the first functionality circuit configured to perform the first functionality. Additionally or alternatively to one or more of the examples disclosed above, in some examples, the logic is configured to control the performance of the first functionality on the first functionality circuit in accordance with an instruction, received from the processor, to perform the first functionality. Additionally or alternatively to one or more of the examples disclosed above, in some examples, the logic is configured to control a first power state of the first functionality circuit in the input element. Additionally or alternatively to one or more of the examples disclosed above, in some examples, the input element includes a plurality of functionality circuits, including the first functionality circuit and a second functionality circuit, and the logic is configured to control the first power state of the first functionality circuit independently of a second power state of the second functionality circuit. Additionally or alternatively to one or more of the examples disclosed above, in some examples, the electronic device further comprises: power circuitry configured to deliver power to the circuitry in the input element via a power link, wherein the processor is configured to communicate with the circuitry in the input element via a data link. Additionally or alternatively to one or more of the examples disclosed above, in some examples, the data link and the power link comprise a shared data and power link configured to concurrently transmit: power from the power circuitry to the circuitry in the input element, and data between the circuitry in the input element and the processor. Additionally or alternatively to one or more of the examples disclosed above, in some examples, the shared data and power link comprises an inductive data and power link. Additionally or alternatively to one or more of the examples disclosed above, in some examples, the processor is configured to control the power circuitry to selectively deliver power to the circuitry in the input element. Additionally or alternatively to one or more of the examples disclosed above, in some examples, the data link and the power link are configured to allow the input element to move while data or power or both are delivered to the circuitry in the input element. Additionally or alternatively to one or more of the examples disclosed above, in some examples, the circuitry is configured to: perform a second functionality; determine whether to offload processing of data resulting from the performance of the second functionality; in accordance with a determination to offload the processing of the data resulting from the performance of the second functionality, output the data from the input element to the processor; and in accordance with a determination not to offload the processing of the data resulting from the performance of the second functionality, process the data resulting from the performance of the second functionality and output the processed data from the input element to the processor. Additionally or alternatively to one or more of the examples disclosed above, in some examples, the first functionality is the same as the second functionality.

Some examples of the disclosure are directed to an electronic device comprising: an input element configured to move in a first direction in response to an input at the input element, the input element comprising a volume that includes circuitry configured to perform a functionality; and a processor electrically coupled to the circuitry and configured to: process the movement of the input element as an input to the electronic device; and process data, resulting from the performance of the functionality, received from the circuitry and perform an action based on the processed data.

Some examples of the disclosure are directed to a non-transitory computer readable storage medium storing one or more programs, the one or more programs comprising instructions, which when executed by a processor cause the processor to perform a method comprising: processing movement of an input element as an input to an electronic device, the input element configured to move in a first direction in response to an input at the input element; and receiving processed data from the input element and performing an action based on the processed data, wherein the input element includes circuitry configured to: perform a first functionality; and process data resulting from the performance of the first functionality and output the processed data from the input element. Additionally or alternatively to one or more of the examples disclosed above, in some examples, the input element comprises a rotary input configured to rotate in response to the input at the input element. Additionally or alternatively to one or more of the examples disclosed above, in some examples, the circuitry comprises logic and a first functionality circuit, the logic configured to process the data resulting from the performance of the first functionality and output the processed data from the input element, and the first functionality circuit configured to perform the first functionality. Additionally or alternatively to one or more of the examples disclosed above, in some examples, the logic is configured to control the performance of the first functionality on the first functionality circuit in accordance with an instruction, received from the processor, to perform the first functionality. Additionally or alternatively to one or more of the examples disclosed above, in some examples, the logic is configured to control a first power state of the first functionality circuit in the input element. Additionally or alternatively to one or more of the examples disclosed above, in some examples, the input element includes a plurality of functionality circuits, including the first functionality circuit and a second functionality circuit, and the logic is configured to control the first power state of the first functionality circuit independently of a second power state of the second functionality circuit. Additionally or alternatively to one or more of the examples disclosed above, in some examples, the method further comprises: delivering power, via power circuitry, to the circuitry in the input element via a power link, wherein the processor is configured to communicate with the circuitry in the input element via a data link. Additionally or alternatively to one or more of the examples disclosed above, in some examples, the data link and the power link comprise a shared data and power link configured to concurrently transmit: power from the power circuitry to the circuitry in the input element, and data between the circuitry in the input element and the processor. Additionally or alternatively to one or more of the examples disclosed above, in some examples, the shared data and power link comprises an inductive data and power link. Additionally or alternatively to one or more of the examples disclosed above, in some examples, the processor is configured to control the power circuitry to selectively deliver power to the circuitry in the input element. Additionally or alternatively to one or more of the examples disclosed above, in some examples, the data link and the power link are configured to allow the input element to move while data or power or both are delivered to the circuitry in the input element. Additionally or alternatively to one or more of the examples disclosed above, in some examples, the circuitry is configured to: perform a second functionality; determine whether to offload processing of data resulting from the performance of the second functionality; in accordance with a determination to offload the processing of the data resulting from the performance of the second functionality, output the data from the input element to the processor; and in accordance with a determination not to offload the processing of the data resulting from the performance of the second functionality, process the data resulting from the performance of the second functionality and output the processed data from the input element to the processor.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
a mechanical input element operatively coupled to the electronic device having a portion that protrudes outside of a housing of the electronic device configured to move in a first direction in response to an input at the mechanical input element, the mechanical input element including circuitry configured to:
perform a first measurement using a first sensor included within the portion of the mechanical input element that protrudes outside of the housing of the electronic device; and
process data resulting from the performance of the first measurement and output the processed data from the mechanical input element; and
a processor electrically coupled to the circuitry and configured to:
process the movement of the mechanical input element as an input to the electronic device and perform a first action based on the movement of the mechanical input element; and
receive the processed data resulting from the performance of the first measurement and perform a second action based on the processed data, the second action different from the first action.

2. The electronic device of claim 1, wherein the input element comprises a rotary input configured to rotate in response to the input at the input element.

3. The electronic device of claim 1, wherein the circuitry comprises logic and the first sensor, the logic configured to process the data resulting from the measurement using the first sensor and output the processed data from the input element.

4. The electronic device of claim 3, wherein the logic is configured to control the performance of the measurement using the first sensor in accordance with an instruction, received from the processor, to perform the measurement.

5. The electronic device of claim 3, wherein the logic is configured to control a first power state of the first sensor in the input element.

6. The electronic device of claim 5, wherein:
the input element includes a plurality of functionality circuits, including the first sensor and a second functionality circuit, and
the logic is configured to control the first power state of the first sensor independently of a second power state of the second functionality circuit.

7. The electronic device of claim 1, further comprising:
power circuitry configured to deliver power to the circuitry in the input element via a power link, wherein the processor is configured to communicate with the circuitry in the input element via a data link.

8. The electronic device of claim 7, wherein the data link and the power link comprise a shared data and power link configured to concurrently transmit:
power from the power circuitry to the circuitry in the input element, and
data between the circuitry in the input element and the processor.

9. The electronic device of claim 8, wherein the shared data and power link comprises an inductive data and power link.

10. The electronic device of claim 7, wherein the processor is configured to control the power circuitry to selectively deliver power to the circuitry in the input element.

11. The electronic device of claim 7, wherein the data link and the power link are configured to allow the input element to rotate while data or power or both are delivered to the circuitry in the input element.

12. The electronic device of claim 1, wherein the circuitry is configured to:
perform a second functionality;
determine whether to offload processing of data resulting from the performance of the second functionality;
in accordance with a determination to offload the processing of the data resulting from the performance of the second functionality, output the data from the input element to the processor; and
in accordance with a determination not to offload the processing of the data resulting from the performance of the second functionality, process the data resulting from the performance of the second functionality and output the processed data from the input element to the processor.

13. The electronic device of claim 12, wherein the second functionality comprises performing a measurement at a second sensor.

14. An electronic device comprising:
a mechanical input element operatively coupled to the electronic device configured to move in a first direction in response to an input at the mechanical input element, the mechanical input element comprising a volume that protrudes outside of a housing of the electronic device that includes a first circuitry enclosed within the volume configured to:
perform a first measurement using a first sensor included within the volume that protrudes outside of the housing of the electronic device; and
output data based on the measurement using the first sensor with the first circuitry; and
a processor electrically coupled to the circuitry and configured to:
process the movement of the mechanical input element as an input to the electronic device and perform a first action based on the movement of the mechanical input element; and
process the data resulting from the first measurement using the first sensor and received from the first circuitry and perform a second action based on the processed data, the second action different from the first action.

15. A non-transitory computer readable storage medium storing one or more programs, the one or more programs comprising instructions, which when executed by a processor cause the processor to perform a method comprising:
processing movement of a mechanical input element as an input to an electronic device, the mechanical input element operatively coupled to the electronic device having a portion that protrudes outside of a housing of the electronic device configured to move in a first direction in response to an input at the mechanical input element and performing a first action based on the movement of the mechanical input element; and
receiving processed data from the mechanical input element and performing second action, different from the first action, based on the processed data, wherein the mechanical input element includes circuitry configured to:
perform a first measurement using a first sensor included within the portion of the mechanical input element that protrudes outside of a housing of the electronic device; and
process data resulting from the first measurement using the first sensor and output the processed data from the mechanical input element.

16. The non-transitory computer readable storage medium of claim 15, wherein the input element comprises a rotary input configured to rotate in response to the input at the input element.

17. The non-transitory computer readable storage medium of claim 15, wherein the circuitry comprises logic and the first sensor, the logic configured to process the data resulting from the performance of the first functionality and output the processed data from the input element.

18. The non-transitory computer readable storage medium of claim 17, wherein the logic is configured to control the performance of the first measurement using the first sensor in accordance with an instruction, received from the processor, to perform the measurement.

19. The non-transitory computer readable storage medium of claim 17, wherein the logic is configured to control a first power state of the first sensor in the input element.

20. The non-transitory computer readable storage medium of claim 19, wherein:
the input element includes a plurality of functionality circuits, including the first functionality circuit and a second functionality circuit, and
the logic is configured to control the first power state of the first functionality circuit independently of a second power state of the second functionality circuit.

21. The non-transitory computer readable storage medium of claim 15, the method further comprising:
delivering power, via power circuitry, to the circuitry in the input element via a power link, wherein the processor is configured to communicate with the circuitry in the input element via a data link.

22. The non-transitory computer readable storage medium of claim 21, wherein the data link and the power link comprise a shared data and power link configured to concurrently transmit:
power from the power circuitry to the circuitry in the input element, and
data between the circuitry in the input element and the processor.

23. The non-transitory computer readable storage medium of claim 22, wherein the shared data and power link comprises an inductive data and power link.

24. The non-transitory computer readable storage medium of claim 21, wherein the processor is configured to control the power circuitry to selectively deliver power to the circuitry in the input element.

25. The non-transitory computer readable storage medium of claim 21, wherein the data link and the power link are configured to allow the input element to rotate while data or power or both are delivered to the circuitry in the input element.

26. The non-transitory computer readable storage medium of claim 15, wherein the circuitry is configured to:
perform a second functionality;
determine whether to offload processing of data resulting from the performance of the second functionality;
in accordance with a determination to offload the processing of the data resulting from the performance of the second functionality, output the data from the input element to the processor; and in accordance with a determination not to offload the processing of the data resulting from the performance of the second functionality, process the data resulting from the performance of the second functionality and output the processed data from the input element to the processor.

\* \* \* \* \*